(12) United States Patent
Stanhope (10) Patent No.: US 11,770,988 B2
(45) Date of Patent: Oct. 3, 2023

(54) ADJUSTABLE CLOSING SYSTEM FOR AN AGRICULTURAL IMPLEMENT

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 807 days.

(21) Appl. No.: 16/294,157

(22) Filed: Mar. 6, 2019

(65) Prior Publication Data

US 2020/0281107 A1    Sep. 10, 2020

(51) Int. Cl.
| | | |
|---|---|---|
| A01B 13/02 | (2006.01) | |
| A01B 15/16 | (2006.01) | |
| A01B 79/02 | (2006.01) | |
| A01B 63/00 | (2006.01) | |
| A01B 79/00 | (2006.01) | |
| A01B 49/06 | (2006.01) | |

(52) U.S. Cl.
CPC ............ *A01B 13/025* (2013.01); *A01B 15/16* (2013.01); *A01B 49/06* (2013.01); *A01B 63/002* (2013.01); *A01B 79/005* (2013.01); *A01B 79/02* (2013.01)

(58) Field of Classification Search
CPC ....... A01B 13/025; A01B 15/16; A01B 49/06; A01B 63/002; A01B 79/005; A01B 79/02
See application file for complete search history.

(56) References Cited

U.S. PATENT DOCUMENTS

| | | |
|---|---|---|
| 3,026,829 A | 3/1962 | Lampkin |
| 3,543,860 A | 12/1970 | Field |
| 3,673,970 A | 7/1972 | Hatcher |
| 3,818,995 A | 6/1974 | Mellen |
| 4,499,775 A | 2/1985 | Lasoen |
| 4,979,092 A | 12/1990 | Bergene et al. |
| 5,074,227 A | 12/1991 | Schwitters |
| 5,261,495 A | 11/1993 | Szymczak |
| 5,320,186 A | 6/1994 | Strosser et al. |

(Continued)

FOREIGN PATENT DOCUMENTS

| | | | |
|---|---|---|---|
| CN | 205454438 U | 8/2016 | |
| WO | 2017197292 A1 | 11/2017 | |
| WO | WO-2017197292 A1 * | 11/2017 | ............. A01C 5/064 |

OTHER PUBLICATIONS

PR Newswire, Goodyear Air Springs Plant Seeds, Jun. 12, 1997.

(Continued)

*Primary Examiner* — Tara Mayo (74) *Attorney, Agent, or Firm* — Rebecca Henkel; Rickard DeMille (57) ABSTRACT

A row unit of an agricultural implement includes an opening system configured to engage soil to form a furrow, sensors configured to detect a soil tightness, soil conditions, operational conditions, or a combination thereof, and a closing system configured to close the furrow. The closing system includes a first closing disc configured to engage the soil and close the furrow and a second closing disc configured to engage the soil and close the furrow. The row unit also includes a controller configured to receive feedback from the sensors and to control a position, an orientation, or both, of the first closing disc, the second closing disc, or both, in response to feedback from the sensors.

20 Claims, 7 Drawing Sheets

(56) References Cited

U.S. PATENT DOCUMENTS

| | | |
|---|---|---|
| 5,454,432 A | 10/1995 | Le Clezio |
| 5,524,560 A | 6/1996 | Carter |
| 5,595,249 A * | 1/1997 | Steinberger et al. .. A01B 35/18 172/708 |
| 5,685,245 A * | 11/1997 | Bassett ................ A01B 79/005 111/62 |
| 5,709,271 A * | 1/1998 | Bassett ................ A01B 63/114 111/134 |
| 5,841,282 A | 11/1998 | Christy et al. |
| 6,076,611 A | 6/2000 | Rozendaal et al. |
| 6,079,340 A * | 6/2000 | Flamme et al. .... A01M 7/0089 111/178 |
| 6,116,172 A | 9/2000 | Prairie et al. |
| 6,196,327 B1 | 3/2001 | Patel et al. |
| 6,314,897 B1 | 11/2001 | Hagny |
| 6,345,671 B1 | 2/2002 | Siemens et al. |
| 6,386,128 B1 | 5/2002 | Svoboda et al. |
| 6,749,035 B2 | 6/2004 | Bundy |
| 6,848,377 B2 | 2/2005 | Rylander et al. |
| 7,481,278 B1 | 1/2009 | Pomedli et al. |
| 8,204,689 B2 | 6/2012 | Christy et al. |
| 8,522,889 B2 | 9/2013 | Adams et al. |
| 8,573,319 B1 | 11/2013 | Casper et al. |
| 8,849,523 B1 * | 9/2014 | Chan et al. ......... A01G 25/167 701/50 |
| 8,863,857 B2 | 10/2014 | Bassett |
| 8,869,629 B2 | 10/2014 | Noble et al. |
| 8,903,545 B2 | 12/2014 | Riffel et al. |
| 9,032,886 B2 | 5/2015 | Anderson et al. |
| 9,144,189 B2 | 9/2015 | Stoller et al. |
| 9,167,742 B2 | 10/2015 | Masten et al. |
| 9,215,839 B2 | 12/2015 | Bassett |
| 9,554,504 B2 | 1/2017 | Houck |
| 9,585,307 B2 | 3/2017 | Holland |
| 9,609,802 B2 | 4/2017 | Needham et al. |
| 9,629,304 B2 | 4/2017 | Zielke |
| 9,668,401 B2 | 6/2017 | Raetzman et al. |
| 9,706,703 B2 | 7/2017 | Anderson et al. |
| 9,743,574 B1 | 8/2017 | Maxton et al. |
| 9,826,677 B2 | 11/2017 | Gervais et al. |
| 9,848,524 B2 | 12/2017 | Sander et al. |
| 9,864,094 B2 | 1/2018 | Stoller et al. |
| 9,955,623 B2 | 5/2018 | Sauder et al. |
| 2008/0257570 A1 | 10/2008 | Keplinger et al. |
| 2011/0313575 A1 | 12/2011 | Kowalchuk et al. |
| 2012/0048160 A1 * | 3/2012 | Adams et al. ......... A01C 5/066 111/163 |
| 2012/0083982 A1 * | 4/2012 | Bonefas et al. ..... G05D 1/0223 382/153 |
| 2013/0032363 A1 | 2/2013 | Curry et al. |
| 2013/0197767 A1 * | 8/2013 | Lenz .................... A01D 41/127 701/50 |
| 2013/0248212 A1 * | 9/2013 | Bassett ................ A01C 7/205 172/4 |
| 2014/0000919 A1 | 1/2014 | Bachman et al. |
| 2014/0048295 A1 | 2/2014 | Bassett |
| 2014/0048296 A1 | 2/2014 | Bassett |
| 2014/0076216 A1 * | 3/2014 | Kormann et al. ..... A01B 49/06 111/170 |
| 2014/0116735 A1 | 5/2014 | Bassett |
| 2014/0365084 A1 | 12/2014 | Chan et al. |
| 2015/0271980 A1 * | 10/2015 | Steinlage et al. ...... A01B 15/16 172/604 |
| 2015/0271986 A1 | 10/2015 | Sauder et al. |
| 2015/0305227 A1 | 10/2015 | Zemenchik et al. |
| 2016/0029547 A1 | 2/2016 | Casper et al. |
| 2016/0037709 A1 | 2/2016 | Sauder et al. |
| 2016/0044856 A1 * | 2/2016 | Janelle et al. ......... A01B 39/22 172/574 |
| 2016/0157411 A1 | 6/2016 | Lysaght |
| 2017/0049044 A1 | 2/2017 | Stoller et al. |
| 2017/0067869 A1 | 3/2017 | Lund et al. |
| 2017/0075034 A1 | 3/2017 | Kleeman et al. |
| 2017/0094894 A1 | 4/2017 | Heim et al. |
| 2017/0105335 A1 | 4/2017 | Xu et al. |
| 2017/0135280 A1 | 5/2017 | Rosengren et al. |
| 2017/0202132 A1 | 7/2017 | Maust et al. |
| 2017/0367251 A1 | 12/2017 | Hamilton |
| 2018/0168094 A1 | 6/2018 | Koch et al. |
| 2019/0059206 A1 | 2/2019 | Stanhope et al. |
| 2019/0297769 A1 | 10/2019 | Zielke et al. |
| 2019/0373797 A1 | 12/2019 | Schoeny et al. |
| 2019/0373801 A1 | 12/2019 | Schoeny et al. |
| 2020/0068778 A1 | 3/2020 | Schoeny et al. |

OTHER PUBLICATIONS

Queensland Country Life, Seed spacing, depth, placement and singulation can, May 1, 2014.

Computers and Electronics in Agriculture 127:690-8, Sensor and control for consistent, seed drill coulter depth, Sep. 2016.

Newsrx, Cnh Canada, Ltd.; Patent Issued for Automatic down Pressure Adjustment System for Set of Ganged Disc Dpeners, Journal of Engineering (Atlanta), Oct. 10, 2012: 2395.

* cited by examiner

ADJUSTABLE CLOSING SYSTEM FOR AN AGRICULTURAL IMPLEMENT

BACKGROUND

The disclosure relates generally to an adjustable closing system for an agricultural implement.

Generally, agricultural implements are towed behind a work vehicle, such as a tractor. The agricultural implements generally contain a particulate material, such as seeds, fertilizer, and/or other agricultural product, which is distributed on or in the ground using various methods. For example, certain implements form a furrow in the ground, deposit a seed in the furrow, and then close the furrow over the seed. In some instances, the agricultural implement may not properly form or close the furrow due to soil texture and other soil properties. Improper forming or closure of the furrow may diminish seed germination, extend emergence time, and reduce crop yield.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a row unit of an agricultural implement includes an opening system configured to engage soil to form a furrow, sensors configured to detect a soil tightness, soil conditions, operational conditions, or a combination thereof, and a closing system configured to close the furrow. The closing system includes a first closing disc configured to engage the soil and close the furrow and a second closing disc configured to engage the soil and close the furrow. The row unit also includes a controller configured to receive feedback from the sensors and to control a position, an orientation, or both, of the first closing disc, the second closing disc, or both, in response to feedback from the sensors.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include an adjustable closing system for an agricultural implement. Certain agricultural implements (e.g., harvesters, tillers, seeders, and planters) are towed by a work vehicle and are configured to open a furrow in a field, deposit a seed, and close the furrow. For example, certain agricultural implements include row units that form furrows along rows of the field, deposit seeds in the furrows, and close the furrows. However, certain furrow conditions may inhibit seed germination and emergence rates, such as inadequate coverage of the seed with moist soil, excessive contact of the seed with residue, excessive presence of air gaps in the furrow, inadequate seed-to-soil contact, and excessive soil compaction around the seed (e.g. insufficiently mellow soil which may inhibit seedling emergence rates). Additionally, soil tightness may be understood as a quality of the seedbed that affects the ability of the row unit to adequately close the furrow and properly cover the seed with moist and mellow soil (e.g., a quality of the seedbed that resists closure of the furrow). The agricultural implement described herein may facilitate germination of the seed and growth of the plant. More specifically, the agricultural implement may include an adjustable closing system capable of adjusting the position of one or more discs (e.g., closing discs). For example, the closing discs may be longitudinally offset relative to one another, laterally offset relative to one another, as well as oriented in other ways. By adjusting the position (e.g., the longitudinal offset and/or the lateral offset) and orientation (e.g., angle(s) relative to the soil) of the closing discs, the adjustable closing system is able to respond to different conditions, such as the soil tightness, to facilitate seed germination and emergence.

In some embodiments, the position and/or the orientation of the closing discs may be adjusted in response to feedback from one or more sensors. For example, the implement may include one or more sensors that detect soil tightness, one or more other soil conditions (e.g., moisture content, soil flow, soil compaction, soil structure, soil texture, depth of the furrow, etc.), position(s) of the closing disc(s) with respect to the soil, the furrow formed by an opening system, or a combination thereof. The sensors may also detect operation of the planter (e.g., operational conditions) such as operating speed of vehicle (e.g., tractor), vibration, temperature, rotational speed, rotational position, strain, etc. Such operational conditions may also include position(s), orientation(s), and/or pressure(s) applied to controllable components of a row unit of the planter. As a controller receives sensor feedback about the soil tightness, the other soil conditions, and/or the operational conditions of the agricultural equipment, the controller may instruct various actuators to adjust the position and/or the orientation of the discs. For example, the controller may adjust the position and/or the orientation based on the soil tightness as detected by the sensors. Additionally or alternatively, the controller may determine the soil tightness based on the feedback from the sensors (e.g., based on a depth of the discs and a pressured applied to the discs by an actuator) and adjust the position and/or the orientation based on the soil tightness. Such adjustments may facilitate covering the seeds with moist and mellow soil, thereby facilitating seed germination and emergence.

Figure 1:
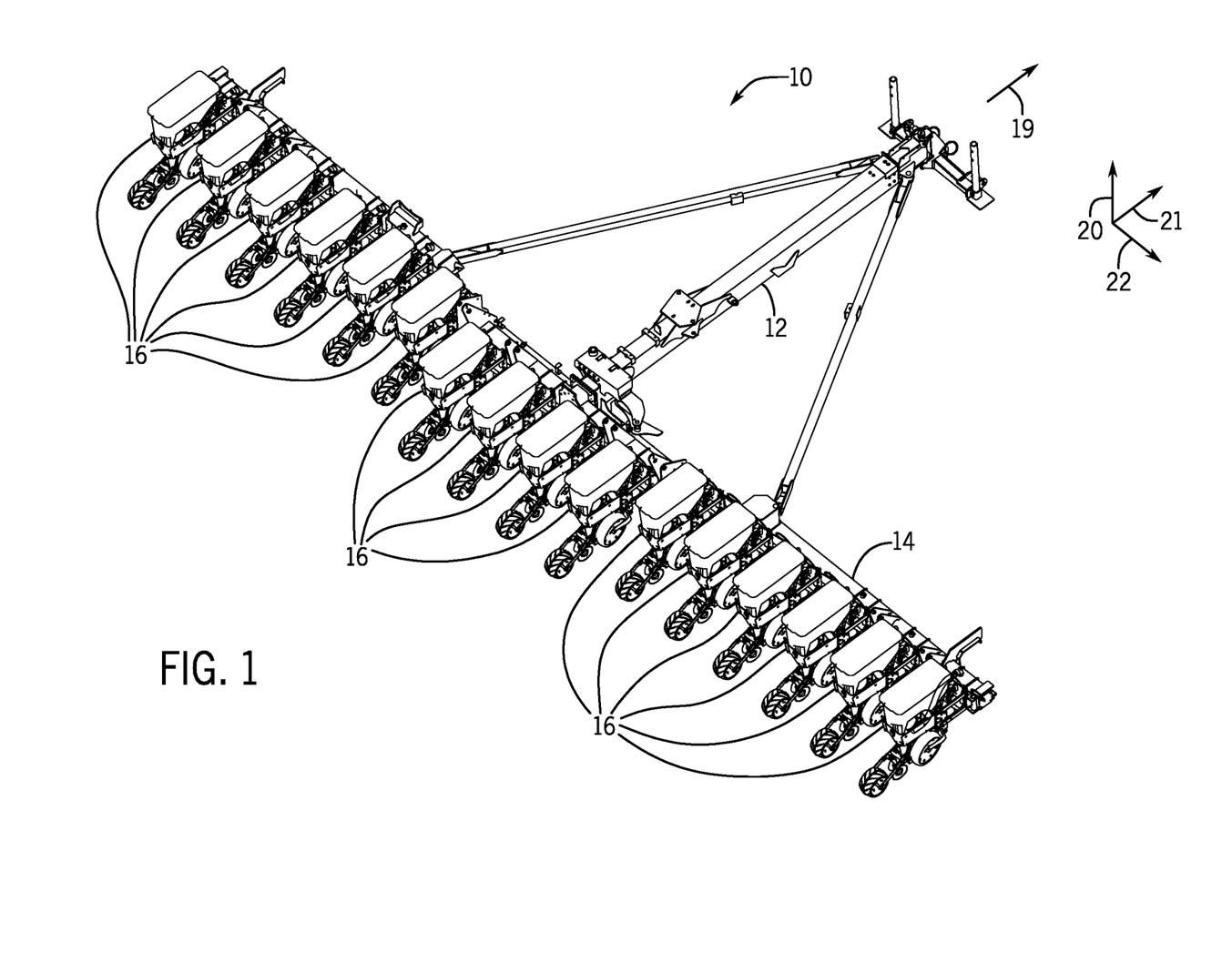
FIG. 1 is a perspective view of an embodiment of an agricultural implement, in accordance with an aspect of the present disclosure.

With the foregoing in mind, the present embodiments relating to adjustable closing systems may be utilized within any suitable agricultural system. For example, FIG. 1 is a perspective view of an embodiment of an agricultural implement 10 (e.g., a planter). To facilitate discussion, the implement 10 and certain components of the implement 10 may be described with reference to a vertical axis or direction 20, a longitudinal axis or direction 21, and a lateral axis or direction 22. The implement 10 may be towed behind a work vehicle (e.g., a tractor) in a direction 19 generally along the longitudinal axis 21. The implement 10 includes a tongue assembly 12, which is shown in the form of an A-frame hitch assembly. The tongue assembly 12 may include a hitch used to attach to an appropriate vehicle hitch via a ball, clevis, or other coupling. For example, a tongue of the implement 10 may be connected to a drawbar of the work vehicle, or a mast of the implement may be connected to a 3-point hitch of the work vehicle. The tongue assembly 12 is coupled to a tool bar 14 which supports multiple row units 16.

In certain embodiments, each row unit 16 may include an opening system coupled to a chassis of the row unit 16 and configured to engage soil to form a furrow for seed deposition. The row unit 16 may also include a gauge wheel assembly movably coupled to the chassis. The gauge wheel assembly may include a gauge wheel configured to rotate across a soil surface to limit a penetration depth of the opening discs into the soil. Additionally, each row unit 16 may include an adjustable closing system that closes the furrow formed by the opening system (e.g., after seed deposition). As will be explained below, the agricultural implement 10 may include one or more sensors that detect soil tightness, other soil conditions, and/or operational conditions of agricultural equipment, and in response, adjust the position and/or the orientation of the one or more closing discs to facilitate closing of the furrow.

Figure 2:
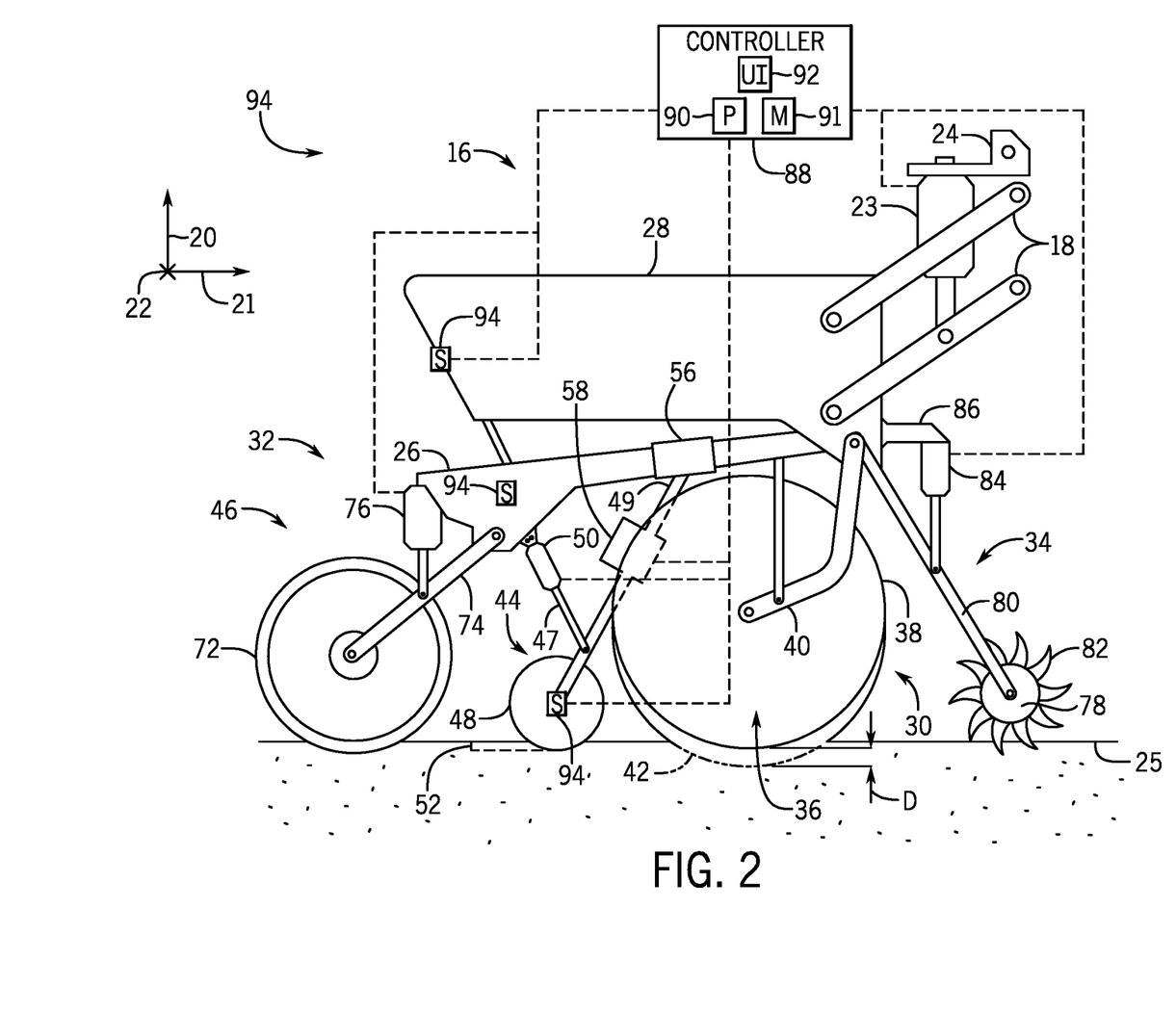
FIG. 2 is a side view of an embodiment of a row unit of the agricultural implement in FIG. 1, in accordance with an aspect of the present disclosure.

FIG. 2 is a side view of an exemplary row unit 16 that may be employed within the agricultural implement 10 shown in FIG. 1. As illustrated, the row unit 16 includes elements 18 of a parallel linkage assembly, also known as a four-bar linkage, configured to couple the row unit 16 to the tool bar 14, while enabling vertical movement of the row unit 16. In addition, a down force actuator 23 extends between a mounting bracket 24 and a lower portion of the parallel linkage 18 to establish a contact force between the row unit 16 and soil 25. The down force actuator 23 is configured to apply a force to the row unit 16 in a downward direction (e.g., along the vertical axis 20), thereby driving a ground engaging tool into the soil 25. As will be appreciated, a desired level of down force may vary based on soil tightness, soil type, the degree of tillage applied to the soil, soil moisture content, amount of residue cover, a speed of the agricultural implement, weight of the row unit 16, and/or tool wear, among other factors. Because such factors may vary from one side of the implement 10 to the other, a different level of down force may be selected for each row unit 16.

In certain embodiments, the down force actuator 23 may be coupled to a controller 88 configured to automatically regulate the pressure within the down force actuator 23 to maintain a desired contact force between the ground engaging tools and the soil. Because each row unit 16 includes an independent down force actuator 23, the contact force may vary across the implement 10, thereby establishing a substantially uniform seed deposition depth throughout the field. In some embodiments, the down force actuator 23 may retract to apply an upward force. For example, in some environments, the planter may work with light soils when the weight of the row unit 16 itself is excessive for the amount of downforce needed.

In the present embodiment, the parallel linkage elements 18 are pivotally coupled to a chassis 26 and a frame 28. In some embodiments, the chassis 26 and the frame 28 may be one-piece or integral (e.g., cast as one-piece). The frame 28 may be configured to support various elements of the row unit 16 such as a metering system and a product storage container, for example. As illustrated, the chassis 26 supports an opening system 30, an adjustable closing system 32, and a residue manager system 34. In the present configuration, the opening system 30 includes a gauge wheel assembly 36 having a gauge wheel 38 and a rotatable arm 40 which functions to movably couple the gauge wheel 38 to the chassis 26. The gauge wheel 38 may be positioned a vertical distance D above an opening disc 42 of the opening system 30 to establish a desired furrow depth for seed deposition into the soil 25. As the row unit 16 travels across a field, the opening disc 42 forms a furrow in the soil 25, and seeds are deposited into the furrow. The down force actuator 23 is configured to adjust the penetration depth D of the opening disc 42 by varying a position of the gauge wheel 38 relative to the chassis 26. While the opening system 30 is illustrated with a single opening disc 42, it should be appreciated that alternative embodiments may include a pair of opening discs positioned on opposite sides of the chassis and adjacent to a corresponding pair of gauge wheels. In such configurations, the opening discs may be angled toward one another to establish a wider furrow within the soil.

Seeds may be deposited within the furrow via a seed tube extending between a metering system within the frame 28 and the soil 25. The seed tube exit may be positioned aft of the opening system 30 and forward of the closing system 32 along the longitudinal axis such that seeds flow into the furrow. As illustrated, the closing system 32 includes a closing assembly 44 and a press wheel assembly 46. The closing assembly 44 includes a closing disc 48 configured to fracture and generate a flow of soil into the furrow. The closing system 32 includes a bar 47 extending between the chassis 26 and the closing disc 48 (e.g., between the chassis 26 and a bar 49 coupled to the closing disc 48). A closing disc actuator 50 is coupled to the bar 47 of the closing system 32 and is configured to regulate a contact force between the closing disc 48 and the soil 25. For example, a large contact force may be applied to effectively push tighter soil into the furrow, while a relatively small contact force may be applied to close a furrow with loose soil. In some embodiments, a large contact force may be applied so that the closing disc 48 penetrates the soil 25 and achieves a proper depth of engagement. While the view illustrates one closing disc 48, it should be appreciated that the closing assembly 44 may include a pair of closing discs 48. Additionally, certain embodiments may employ closing wheels instead of the illustrated closing disc 48. In some embodiments, the closing disc 48 may be a cutting disc that actually cuts into the soil 25 to drive soil into the furrow. Accordingly, the actuator 50 may provide the force to drive the closing disc 48 into the soil 25 a distance 52. In some embodiments, the closing system 32 may include additional actuators that enable the closing system 32 to adjust the orientation and/or position of the closing disc 48 (e.g., a geometry of the closing system 32) in response to detected soil tightness, soil conditions, and/or operational conditions of the agricultural implement 10 (e.g., of the row unit 16). Such operational conditions of the row unit 16 may include position(s), orientation(s), and/or pressure(s) applied to controllable components of the row unit 16.

As illustrated, the closing system 32 includes an actuator 56 coupled to the bar 49 that enables the closing system 32 to adjust the position of the closing disc 48 relative to another disc(s) (e.g., closing disc) generally along the longitudinal axis 21. As such, the closing system 32 enables adjustment of the closing disc 48 with respect to another closing disc and/or with respect to another portion of the row unit 16 based on a soil condition and/or an operational condition. The closing system 32 also includes an actuator 58 that enables adjustment of the closing disc 48 relative to another closing disc along the lateral axis 22. That is, the actuator 58 may increase a width between the closing disc 48 and another closing disc(s) on an opposite side of the furrow. The closing system 32 may also include actuator(s) that adjust the camber, castor, and/or toe of the closing disc 48. In certain embodiments, the actuator 56 may enable the closing system 32 to adjust the position of the closing disc 48 relative to another closing disc along the lateral axis 22, and/or the actuator 58 may enable the closing system 32 to adjust the position of the closing disc 48 relative to another closing disc along the longitudinal axis 21. The ability to adjust the geometry of the closing system 32 enables the one or more row units 16 to facilitate a desired seed to soil contact during planting operations by the agricultural implement 10.

As illustrated, the press wheel assembly 46 includes a press wheel 72 positioned aft of the closing disc 48 that serves to pack soil deposited on top of the seeds by the closing disc 48. In the present embodiment, the press wheel assembly 46 includes an arm 74 extending between the chassis 26 and the press wheel 72. A press wheel actuator 76 is coupled to the arm 74 of the press wheel assembly 46, and is configured to regulate a contact force between the press wheel 72 and the soil. For example, in dry conditions, it may be desirable to firmly pack soil directly over the seeds to seal in moisture. In damp conditions, it may be desirable to leave the soil over the seeds fairly loose to avoid compaction which may result in soil crusting. The process of excavating a furrow into the soil, depositing seeds within the furrow, closing the furrow and packing soil on top of the seeds establishes a row of planted seeds within a field. By employing multiple row units 16 distributed along the tool bar 14, as shown in FIG. 1, multiple rows of seeds may be planted within the field.

Additionally, the row unit 16 includes the residue manager system 34 configured to prepare the soil 25 before seed deposition. As illustrated, the residue manager system 34 includes a residue manager 78 coupled to the chassis 26 by an arm 80. The residue manager 78 includes points or fingers 82 configured to break up or move aside crop residue on the soil surface. In other words, the residue manager system 34, may reduce and/or block deposition of residue in the seed furrow which may affect seed germination and emergence. A residue manager actuator 84 extends from a bracket 86 to the arm 80 of the residue manager system 34, and is configured to regulate a contact force between the residue manager 78 and the soil. While a single residue manager 78 is shown in the present embodiment, it should be appreciated that alternative embodiments may include a pair of residue manages angled toward one another.

Each of the actuators discussed above (e.g., 23, 50, 56, 58, 76, 84) may be controlled by a controller 88 of the agricultural implement and the row unit 16 to facilitate opening a furrow, closing the furrow, and then packing soil deposited over the furrow in a way that facilitates seed germination and growth. That is, the controller 88 coordinates operation of the actuators in response to detected soil tightness, soil conditions, and/or operating conditions of the agricultural implement 10.

As illustrated, the controller 88 may include a processor 90, a memory 91, and a user interface 92. The controller 88, via the processor 90, may receive one or more signals from one or more sensors 94. For example, the processor 90 may be a microprocessor that executes software to control the various actuators on the row unit 16 in response to feedback from the sensors 94. The processor 90 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 90 may include one or more reduced instruction set (RISC) processors.

The memory 91 may include a volatile memory, such as random access memory (RAM), and/or a nonvolatile memory, such as read-only memory (ROM). The memory 91 may store a variety of information and may be used for various purposes. For example, the memory 91 may store processor executable instructions, such as firmware or software, for the processor 90 to execute. The memory may include ROM, flash memory, a hard drive, or any other suitable optical, magnetic, or solid-state storage medium, or a combination thereof. The memory may store data, instructions, and any other suitable data.

The user interface 92 may display values associated with the adjustable closing system 32 and the row unit 16 to an operator of the agricultural implement and/or may enable interaction between the operator and the adjustable closing system 32 and the row unit 16. For example, the user interface 92 may display values (e.g., the soil tightness) detected by the sensors 94, may display values (e.g., the soil tightness) determined by the controller 88 based on the feedback from the sensors 94, may include certain options selectable by the operator for the controlling the closing system 32, may include certain options selectable by the operator for the controlling the row unit 16, or a combination thereof. Additionally, the user interface 92 may display values and/or may enable interaction with each row unit 16 of the agricultural implement.

As described above, the sensors 94 may detect soil tightness, other soil conditions, and/or operating conditions of the agricultural implement (e.g., the closing disc 48 and the row unit 16). For example, the sensors 94 may include soil tightness sensors configured to detect the soil tightness via ground penetrating RADAR, multispectral reflectivity of the soil, and/or other methods that may directly detect soil tightness. In certain embodiments, the sensors 94 may include soil condition sensors configured to detect other conditions of the soil and/or operational sensors configured to detect operation of the row unit 16 and/or the agricultural equipment. For example, the sensors 94 may include LIDAR, infrared sensors, optical cameras, accelerometers (e.g., to detect vibration), a gyroscope (e.g., to detect orientation: camber, castor, toe), position sensors (e.g., to detect placement of components relative to row unit frame/chassis), a disc position sensor (e.g., to detect a vertical and/or general position of the disc relative to the soil, relative to another disc, relative to the chassis 26 or the frame 28, or a combination thereof), a disc rotational position sensor (e.g., to detect whether the disc rate of rotation is within expected limits to determine whether the disc is stuck, dragging, sliding, failing, not fully engaged with the ground), a torsion sensor (e.g., to detect rolling resistance to determine whether the disc is stuck, dragging, sliding, failing, not fully engaged with the ground), a draft sensor (e.g., to detect deflection due to forces on ground engaging components), or a combination thereof.

In certain embodiments, the controller 88 may determine the soil tightness, among other soil conditions/characteristics, based on the feedback from the sensors 94. For example, the controller 88 may receive a signal from the sensor 94 indicative of the position of the closing disc 48 with respect to the soil 25 and/or with respect to the chassis 26 or other portions of the row unit 16 (e.g., the sensor 94 may be an infrared sensor or another type of sensor configured to detect the position of the closing disc 48 relative to the soil 25 and/or relative to the chassis 26 or other portions of the row unit 16). Additionally, the controller 88 may be configured to determine a pressure applied by an actuator (e.g., the actuator 50, 56, 58, or a combination thereof) of the closing system 32 to the closing disc 48 and/or may receive a sensor signal indicative of the pressure applied by the actuator to the closing disc 48 (e.g., a sensor may be coupled to the actuator 50, 56, 58, or a combination thereof and may be configured to output a sensor signal indicative of the pressure applied by the actuator 50, 56, 58, or a combination thereof). In certain embodiments, sensor(s) may be disposed on or within the bar 47 and/or the bar 49 and may be configured to output sensor signals indicative of the position of the closing disc 48 with respect to the soil 25 and/or with respect to the chassis 26 or other portions of the row unit 16. Based on the position of the closing disc 48 with respect to the soil 25, the chassis 26, the frame 28, or a combination thereof, and based on the pressure applied to the closing disc 48, the controller 88 may determine the tightness of the soil 25. In some embodiments, the controller 88 may determine the tightness of the soil 25 based on feedback from ground penetrating RADAR, and other sensors configured to detect soil tightness.

By way of example, a position sensor may be coupled to the bar 47 and/or to the actuator 50 and may be configured to output the sensor signal indicative of the position of the closing disc 48 with respect to the soil 25 and/or with respect to the chassis 26 or other portions of the row unit 16.

Additionally, a sensor may be coupled to the actuator 50 and may be configured to output a sensor signal indicative of the pressure applied by the actuator 50 to the closing disc 48. Based on the position of the closing disc 48 with respect to the soil 25 and/or with respect to the chassis 26 or other portions of the row unit 16 and based on the pressure applied by the actuator 50 to the closing disc 48, the controller 88 may determine the soil tightness. For example, the soil tightness may be proportionally related to the position of the closing disc 48 and/or to the pressure applied to the closing disc 48, and the controller 88 may refer to reference tables to determine a soil tightness that corresponds to the position of the closing disc 48 and/or the pressure applied to the closing disc 48.

Based on the soil tightness (e.g., the soil tightness sensed by the sensors 94 and/or determined by the controller 88 based on the feedback from the sensors 94), the controller 88 may execute instructions stored in the memory 91 via the processor 90 to control the actuators of the row unit 16 to control the movement of soil into the furrow and/or soil compaction around the furrow. For example, if the soil tightness is relatively high, the controller 88 may adjust a relative position and/or geometry of the closing disc 48 via the actuator 50, the actuator 56, the actuator 58, or a combination thereof, to increase penetration and/or breakup of the soil 25. If the soil tightness is relatively low, the controller 88 may adjust a relative position and/or geometry of the closing disc 48 via the actuator 50, the actuator 56, the actuator 58, or the combination thereof, to reduce drag on the row unit 16 causes by the closing system 32. In certain embodiments, the controller 88 may control the press wheel actuator 76 to control the force of the press wheel 72 on the soil covering the furrow. In this way, the controller 88 may reduce soil compaction around the seed and increase oxygen flow to the seed. In some embodiments, the controller 88 may adjust a position of and a pressure applied to the gauge wheel assembly 36 and the opening disc 42 via the actuator 23 and/or a position of and a pressure applied to the residue manager 78 via the actuator 84 based on the soil tightness.

As the soil tightness changes, the sensors 94 may detect the changing soil tightness and/or the controller 88 may determine the changing soil tightness, and in response, the controller 88 may adjust one or more of the actuators of the row unit 16 (e.g., the actuators 23, 50, 56, 58, and 76). Specifically, the controller 88 may adjust the position and/or the orientation of the closing disc 48 via the actuator 50, the actuator 56, the actuator 58, or the combination thereof. The adjustments to the closing disc 48 may enable the closing system 32, and the row unit 16 and the agricultural implement generally, to react to the changing soil tightness and facilitate closure of the furrow after deposition of the seed. As such, the adjustable closing system 32 may facilitate seed planting and germination.

Figure 3:
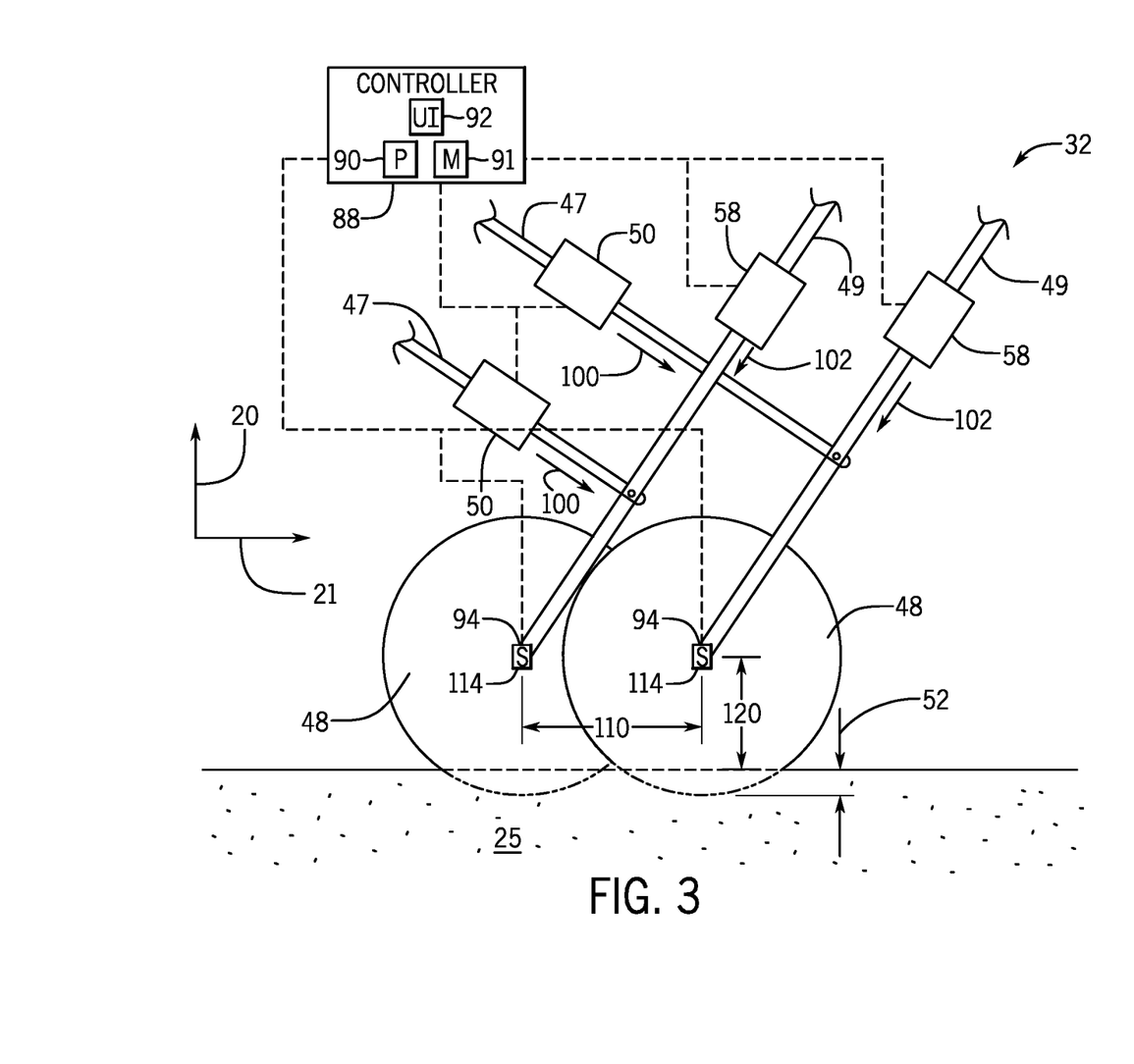
FIG. 3 is a side view of an embodiment of an adjustable closing system, in accordance with an aspect of the present disclosure.

FIG. 3 is a side view of the adjustable closing system 32. As described above, the adjustable closing system 32 includes closing discs 48 that drive soil into the furrow, thereby covering the deposited seeds with soil. As illustrated, the adjustable closing system 32 includes two closing discs 48. In certain embodiments, the closing system 32 may include more closing discs (e.g., three closing discs, four closing discs, etc.). The closing discs 48 may be coupled to the chassis of the row unit via the bars or linkages 49 that extend between the chassis and the closing discs 48. In some embodiments, the closing discs 48 may be cutting discs that cut into the soil 25 to drive soil into the furrow formed by the opening system 30 (e.g., the closing discs 48 may have cutting surfaces configured to cut into the soil 25). In certain embodiments, the closing discs 48 may be press wheels (e.g., V-press wheels) that drive soil into the furrow by pressing down on the surface of the soil.

As described above, the adjustable closing system 32 and the row unit 16 generally may adjust the position of the closing discs 48 in response to the soil tightness to facilitate seed germination and emergence. For example, the controller 88 may actuate the actuators 50 to adjust a downward force on the closing discs 48 in a direction 100 and/or to adjust relative positions of the closing discs 48. Additionally or alternatively, the controller 88 may actuate the actuators 56 to adjust the downward force on the closing discs 48 in a direction 102 and/or to adjust the relative positions of the closing discs 48. The adjustment in force in the directions 100 and/or 102 may enable the closing discs 48 to penetrate a distance 52 into the soil 25 to drive soil into the furrow excavated by the opening system 30. The actuators 50 and 56 may operate together or independently. Further, because each closing disc 48 is controlled with respective actuators 50 and/or 56, the distance 52 that each closing disc 48 penetrates the soil 25 may be controlled independently. For example, in response to feedback from the sensors 94 (e.g., based on the soil tightness), the controller 88 may adjust how far each of the closing discs 48 penetrates into the soil 25 (e.g., the distance 52). That is, a first closing disc 48 may penetrate the soil 25 a greater amount than a second closing disc 48 to facilitate covering the furrow with soil. An increase in the downward force may also enable the closing discs 48 to cut farther into soil types with a higher soil tightness (e.g., clay, wet soil).

As illustrated, the closing discs 48 are offset from one another along the longitudinal axis 21 by a longitudinal distance 110. In some embodiments, the actuators 50 and/or 56 may adjust the relative positions of the closing discs 48 along the longitudinal axis 21 (e.g., the distance 110) to control soil movement into the furrow. For example, in response to feedback from the sensors 94 (e.g., based on the soil tightness), the controller 88 may, via control signals output to the actuators 50 and/or 56, move one or both closing discs 48 along the longitudinal axis 21 to adjust the distance 110. As illustrated, contraction and/or extension of the bar 47 and/or of the bar 49 enables the closing discs 48 to move along the longitudinal axis 21. In certain embodiments, the distance 110 may be between about four inches and about zero inches. In other embodiments, the distance 110 may be between about six inches and about zero inches, between about eight inches and about zero inches, between about eight inches and about two inches, between about six inches and about two inches, or other suitable distances. As such, the controller 88 is configured to adjust the distance 110 based on the feedback from the sensors 94.

As illustrated, the closing discs 48 are coupled to the bars 49 via axles 114. Additionally, the closing system 32 includes the sensors 94 coupled to the axles 114. As described above, the sensors 94 may be configured to detect the position of the closing discs 48 relative to the soil 25. For example, a respective sensor 94 coupled to the axle 114 may be configured to detect a generally vertical distance 120 between the axle 114 and the soil 25. As such, the sensors 94 may be optical sensors, infrared sensors, RADAR, LIDAR, other sensors configured to detect the positions of the closing discs 48 relative to the soil 25 (e.g., the distance 120 between the axle 114 and the soil 25), or a combination thereof. Based on the distance 120 and the pressure applied to the closing discs 48 via the actuators 50 and/or 56, the controller 88 may determine the soil tightness and may control the position and/or the orientation of the closing discs 48 based on the soil tightness.

Figure 4:
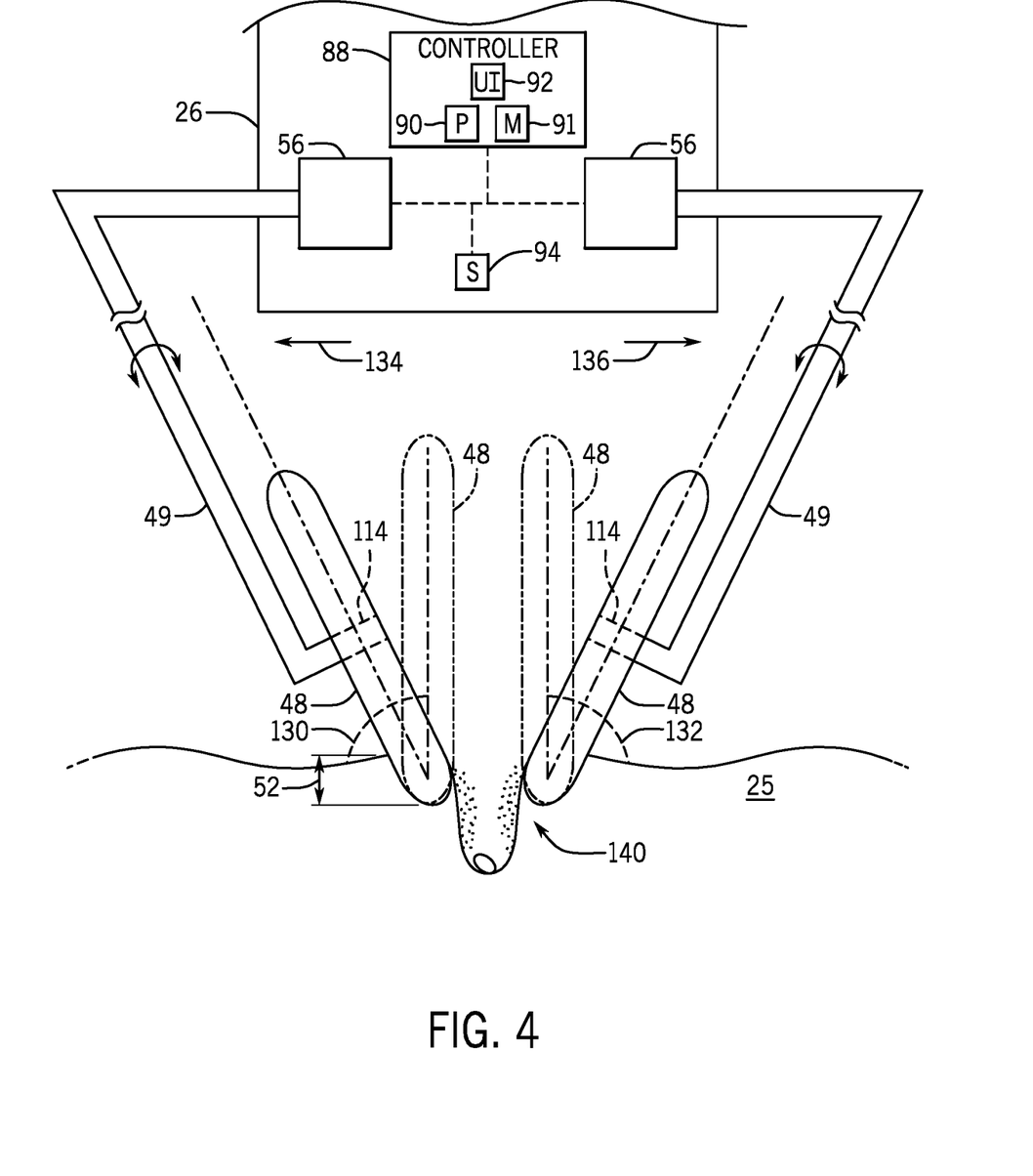
FIG. 4 is a rear view of an embodiment of an adjustable closing system, in accordance with an aspect of the present disclosure.

FIG. 4 is a rear view of an embodiment of an adjustable closing system 32. As described herein, the closing system 32 may enable independent movement of the closing discs 48 in response to the soil tightness detected by the sensors 94 and/or in response to the soil tightness determined by the controller 88 based on the feedback from the sensors 94. For example, the controller 88 is configured to adjust an angle 130 and an angle 132 of the closing discs 48 with respect to the soil 25 via the actuators 56. As the actuators 56 move the bars 49 along axis/directions 134 and 136, the respective angles 130 and 132 adjust with respect to the soil 25. In certain embodiments, the angles 130 and 132 may be adjusted between about ten degrees and about one hundred twenty degrees, between about thirty and about ninety degrees, between about fifty and about seventy degrees, etc. with respect to the soil 25. Additionally or alternatively, the closing discs 48 may be actuated independent of each other to enable the closing system 32 to place the closing discs 48 at generally the same angle or different angles with respect to each other. By adjusting the angle of the closing discs 48 with respect to the soil 25, may facilitate closure of a furrow 140 with soil in different planting conditions.

Figure 5:
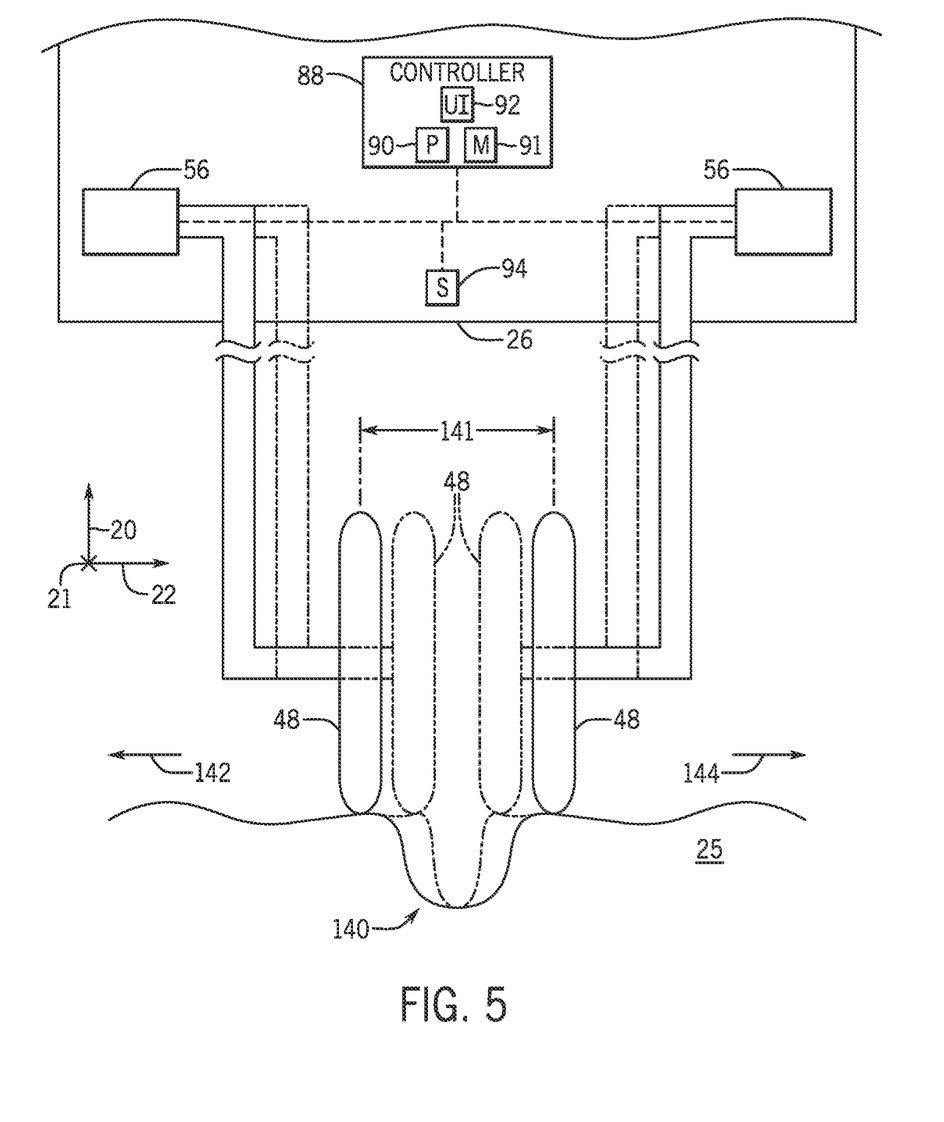
FIG. 5 is a rear view of an embodiment of an adjustable closing system, in accordance with an aspect of the present disclosure.

FIG. 5 is a rear view of an embodiment of an adjustable closing system 32. As described herein, the closing system 32 may enable independent movement of the closing discs 48 in response to the soil tightness detected by the sensors 94 and/or in response to the soil tightness determined by the controller 88 based on the feedback from the sensors 94. For example, the actuators of the closing system 32 (e.g., the actuators 56 and the other actuators described above) enable the closing discs 48 to be adjusted relative to one another along the longitudinal axis 21 (e.g., in the direction of travel), adjusted relative to one another along the lateral axis 22 (e.g., in a direction orthogonal or substantially orthogonal to the direction of travel), as well as adjusted relative to one another via an angular displacement of the closing discs 48 relative to the soil 25. FIG. 5 illustrates an embodiment of the closing system 32 that enables displacement of the closing discs 48 relative to the furrow 140 and to each other along the lateral axis 22. As illustrated, a distance 141 between the closing discs 48 (e.g., a lateral distance) may be adjusted via the actuators 56. The distance 141 may be between about six inches and about zero inches, between about four inches and about zero inches, between about six inches and about two inches, between about six inches and about four inches, between about two inches and about one inch, or other suitable distances.

In operation, the controller 88 receives feedback from one or more sensors 94 that detect the soil tightness, and/or the controller 88 determines the soil tightness based on the feedback from the sensors. Based on the soil tightness, the controller 88 controls operation of the actuators of the closing system (e.g., the actuators 56 and/or the other actuators described above) to adjust the distance 141 between the closing discs 48. For example, to adjust the position of the closing discs 48 in directions 142 and/or 144, the controller 88 actuates actuators 56 coupled to the bars 49. As the actuators 56 move the bars 49 in the directions 142 and/or 144, the lateral position of the closing discs 48 relative to each other and to the furrow 140 may change (e.g., the distance 141 may change). Additionally or alternatively, the closing discs 48 may be actuated independent of each other to enable the closing system 32 to place the closing discs 48 at different positions relative to the furrow 140. For example, one of the closing discs 48 may be closer to the furrow 140 than the other closing disc 48. By adjusting the position of the closing discs 48 relative to the furrow 140 and relative to one another (e.g., the distance 141), the controller 88 is able to facilitate closure of the furrow 140 based on the soil tightness.

Figure 6:
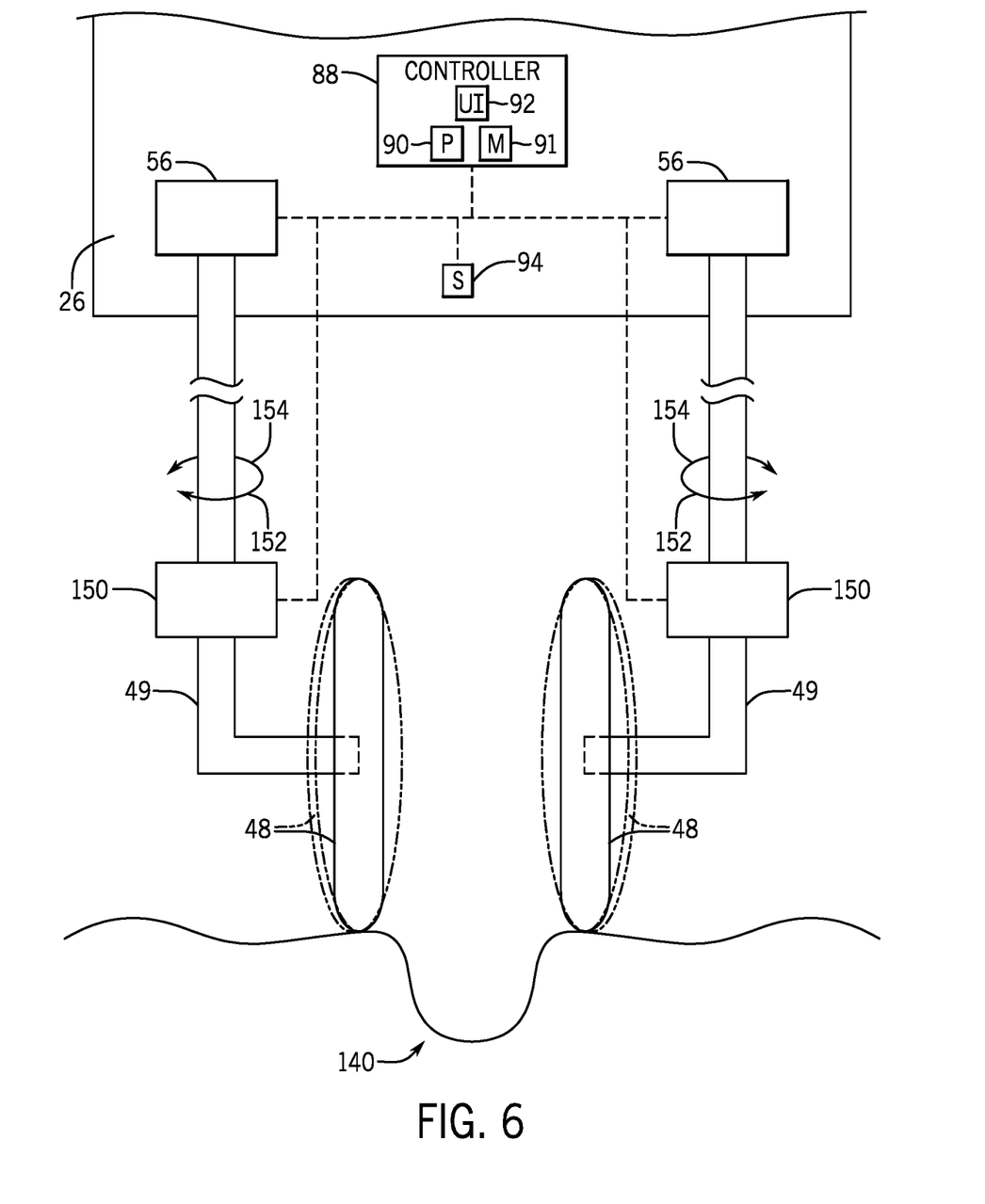
FIG. 6 is a rear view of an embodiment of an adjustable closing system, in accordance with an aspect of the present disclosure.

FIG. 6 is a rear view of an embodiment of an adjustable closing system 32. As described herein, the closing system 32 may enable independent movement of the closing discs 48 in response to the soil tightness detected by the sensors 94 and/or in response to the soil tightness determined by the controller 88 based on the feedback from the sensors 94. For example, as illustrated, the closing system 32 includes actuators 150 that enable rotation of the closing discs 48 with respect to one another and with respect to the furrow 140. The actuators 150 are coupled to the bars 49, and the controller 88 is configured to actuate the actuators 150 to rotate the bars 49 in the directions 152 and/or 154, thereby rotating the closing discs 48. As such, the actuators 150 may rotate the bars 49 in the directions 152 and/or 154 to rotate the closing discs 48 in the directions 152 and/or 154. For example, the actuators 150 may rotate the closing discs 48 between 90 degrees in either direction (e.g., +/−90 degrees). Additionally or alternatively, the closing discs 48 may be actuated independent of each other to enable the closing system 32 to place the closing discs 48 at symmetric or asymmetric angles relative to the furrow 140. The ability to rotate the closing discs 48 may facilitate closure of the furrow 140 based on the soil tightness.

Figure 7:
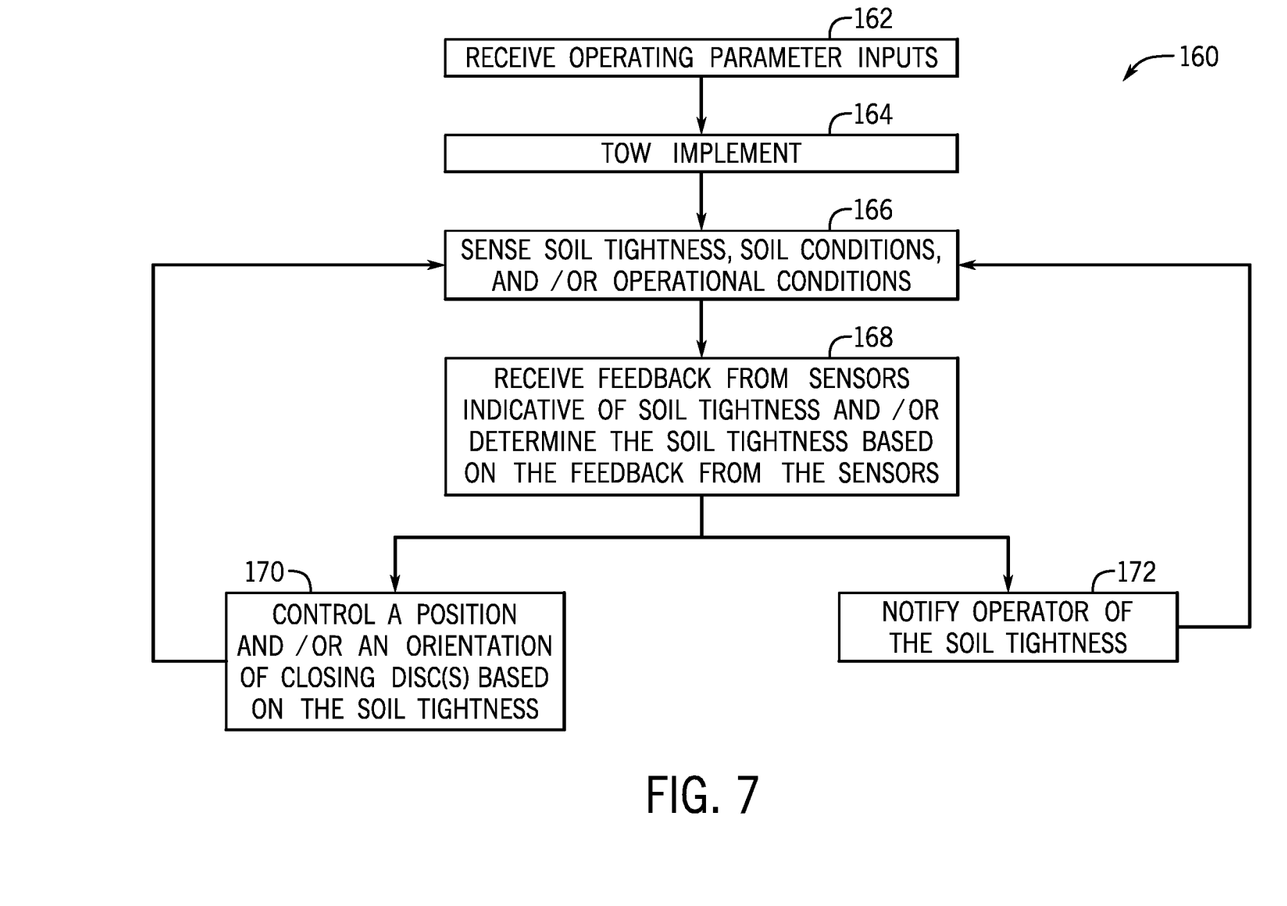
FIG. 7 is a flow diagram of an embodiment of a process for controlling an adjustable closing system, in accordance with an aspect of the present disclosure.

FIG. 7 is a flow diagram of an embodiment of a process 160 for controlling the adjustable closing system. For example, the process 160, or portions thereof, may be performed by the controller of the adjustable closing system and of the row unit. The process begins at block 162, where operating parameter inputs are received. The operating parameter inputs may include a general type of soil, a speed of the row unit and/or of the agricultural implement, weather conditions, certain soil conditions, or a combination thereof. The operating parameter inputs may be received via the user interface of the controller of the adjustable closing system and/or may be stored in the memory of the controller.

At block 164, the agricultural implement is towed through the field. As the agricultural implement is towed, the row units of the agricultural implement engage the soil of the field. For example, the opening discs of the row units engage the soil to open the furrows in the field, the row units deposit the seeds into the furrows, and the adjustable closing system, via the closing discs and/or the press wheel, push the soil into the furrows to close the furrows and/or to compact the soil.

At block 166, the sensors of the adjustable closing system and the row unit sense the soil tightness, the soil conditions, the operational conditions, or a combination thereof. For example, as described herein, the sensors may include soil tightness sensors configured to detect the soil tightness via ground penetrating RADAR, multispectral reflectivity of the soil, and/or other methods that may directly detect soil tightness. In certain embodiments, the sensors may include soil condition sensors configured to detect other conditions of the soil and/or operational sensors configured to detect operation of the row unit and/or the agricultural equipment. For example, the sensors may include LIDAR, infrared sensors, optical cameras, accelerometers (e.g., to detect vibration), a gyroscope (e.g., to detect orientation: camber, castor, toe), position sensors (e.g., to detect placement of components relative to row unit frame/chassis), a disc position sensor (e.g., to detect a vertical and/or general position of the disc relative to the soil and/or relative to another disc), a disc rotational position sensor (e.g., to detect whether the disc rate of rotation is within expected limits to determine whether the disc is stuck, dragging, sliding, failing, not fully engaged with the ground), a torsion sensor (e.g., to detect rolling resistance to determine whether the disc is stuck, dragging, sliding, failing, not fully engaged with the ground), a draft sensor (e.g., to detect deflection due to forces on ground engaging components), or a combination thereof.

At block 168, the controller of the adjustable closing system and of the row unit receives the feedback from the sensors indicative of the soil tightness (e.g., receive the feedback from the soil tightness sensors indicative of the soil tightness) and/or determines the soil tightness based on the feedback from the sensors (e.g., may determine the soil tightness, among other soil conditions/characteristics, based on the feedback from the soil condition sensors and/or from the operational sensors). For example, the controller may receive a signal from the sensor indicative of the position of the closing disc with respect to the soil and/or with respect to portion(s) of the row unit (e.g., the sensor may be an infrared sensor or another type of sensor configured to detect the position of the closing disc relative to the soil). Additionally, the controller may be configured to determine a pressure applied by an actuator of the closing system to the closing disc and/or may receive a sensor signal indicative of the pressure applied by the actuator to the closing disc. Based on the position of the closing disc with respect to the soil and/or with respect to the portion(s) of the row unit and based on the pressure applied to the closing disc, the controller may determine the tightness of the soil.

At block 170, based on the soil tightness (e.g., the soil tightness sensed by the sensors and/or determined by the controller based on the feedback from the sensors), the controller controls a position and/or an orientation of one or both closing discs. For example, the controller may output signals to the actuators coupled to the closing discs (e.g., via bars) to adjust the position and/or the orientation of the closing discs. In response, the actuators may adjust the position (e.g., the longitudinal position and/or the lateral position) and/or the orientation (e.g., the angle with respect to the soil and/or the furrow) of one or both closing discs. Additionally or alternatively, at block 172, the controller may, via the user interface, notify the operator of the agricultural implement of the soil tightness. After completing block 170 and/or block 172, the process 160 may return to block 166 to sense the soil tightness, the soil conditions, the operational conditions, or a combination thereof Accordingly, the adjustable closing system and the row unit including the adjustable closing system described herein may improve operation of an agricultural implement via adjustment of the closing system based on a tightness of soil engaged by the row unit. For example, the row unit may include sensors that detect the soil tightness and/or other conditions (e.g., soil conditions and/or operational conditions). The sensors may output signals to a controller of the row unit and of the adjustable closing system. The controller may receive the signals indicative of the soil tightness from the sensors and/or may determine the soil tightness based on the feedback from the sensors. Based on the soil tightness, the controller may control the adjustable closing system to adjust a position and/or an orientation of one or both closing discs of the closing system. For example, the controller may control a longitudinal position of the closing discs relative to one another, a lateral position of the closing discs relative to one another, an angle of the closing discs relative to the soil and/or relative to a furrow formed by the row unit, or a combination thereof. The adjustments to the closing system may improve performance of the closing system. For example, the adjustments may enable the closing system to better fill the furrow with soil, cover a seed within the furrow with soil, reduce drag on the row unit, and other benefits associated with operation of the agricultural implement. The improved seed coverage may improve seed germination and crop production.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A row unit of an agricultural implement, comprising:
   an opening system configured to engage soil to form a furrow;
   one or more sensors configured to detect a tightness of soil, one or more soil conditions, one or more operational conditions, or a combination thereof;
   a closing system configured to close the furrow, wherein the closing system comprises:
      a first closing disc configured to engage the soil and close the furrow; and
      a second closing disc configured to engage the soil and close the furrow; and
   a controller configured to receive feedback from the one or more sensors and to adjust a first longitudinal position of the first closing disc relative to the second closing disc, adjust a second longitudinal position of the second closing disc relative to the first closing disc, or a combination thereof, in response to feedback from the one or more sensors.

2. The row unit of claim 1, wherein the one or more sensors comprise a position sensor.

3. The row unit of claim 2, wherein the position sensor is configured to output a sensor signal indicative of a position of the first closing disc, the second closing disc, or both, with respect to the soil or with respect to another portion of the row unit.

4. The row unit of claim 3, wherein the one or more sensors are configured to provide feedback indicative of a pressure applied to the first closing disc, the second closing disc, or both.

5. The row unit of claim 4, wherein the controller is configured to determine the tightness of the soil based on the position of the first closing disc, the second closing disc, or both, and the pressure applied to the first closing disc, the second closing disc, or both.

6. The row unit of claim 1, wherein the one or more sensors comprise ground penetrating RADAR, and the controller is configured to determine the tightness of the soil based on feedback from the ground penetrating RADAR.

7. The row unit of claim 1, wherein the first closing disc comprises a first cutting surface and the second closing disc comprises a second cutting surface, and wherein the first and second cutting surfaces are configured to cut into the soil to close the furrow.

8. The row unit of claim 1, wherein the first and second closing discs comprise V-press wheels configured to close the furrow and compact the soil around a seed.

9. A row unit of an agricultural implement, comprising:
   an opening system configured to engage soil to form a furrow;
   one or more sensors configured to detect a soil tightness, one or more soil conditions, one or more operational conditions, or a combination thereof;
   a closing system configured to close the furrow, wherein the closing system comprises:
      a first closing disc configured to engage the soil and close the furrow;
      a second closing disc configured to engage the soil and close the furrow;
      a first actuator configured to adjust an angle of the first closing disc, the second closing disc, or both, relative to the furrow; and
      a second actuator configured to adjust a distance between the first and second closing discs along a longitudinal axis generally parallel to the furrow; and
   a controller configured to receive feedback from the one or more sensors and to control a position, an orientation, or both, of the first closing disc, the second closing disc, or both, in response to feedback from the one or more sensors.

10. The row unit of claim 9, wherein the distance between the first closing disc and the second closing disc along the longitudinal axis is about two inches.

11. The row unit of claim 10, wherein the second actuator is configured to adjust the distance between the first closing disc and the second closing disc along the longitudinal axis to be between about four inches and about zero inches.

12. The row unit of claim 9, wherein the feedback from the one or more sensors comprises a vertical position of the first closing disc, the second closing disc, or both, relative to the soil.

13. The row unit of claim 9, comprising a third actuator configured to adjust a second distance between the first and second closing discs along a lateral axis generally perpendicular to the furrow.

14. The row unit of claim 13, wherein the third actuator is configured to adjust the second distance between the first closing disc and the second closing disc along the lateral axis to be between about four inches and about two inches.

15. A row unit of an agricultural implement, comprising:
   an opening system configured to engage soil to form a furrow;
   a closing system configured to close the furrow, wherein the closing system comprises:
      a first closing disc configured to engage the soil and close the furrow; and
      a second closing disc configured to engage the soil and close the furrow;
   one or more sensors configured to provide feedback indicative of a position of the first closing disc, the second closing disc, or both, with respect to the soil or with respect to another portion of the row unit; and
   a controller configured to receive feedback from the one or more sensors and to control a position, an orientation, or both, of the first closing disc, the second closing disc, or both, in response to feedback from the one or more sensors.

16. The row unit of claim 15, wherein the controller is configured to control a first lateral position of the first closing disc relative to the second closing disc, a second lateral position of the second closing disc relative to the first closing disc, or a combination thereof.

17. The row unit of claim 15, wherein the one or more sensors comprise an infrared sensor.

18. The row unit of claim 15, comprising a bar extending between a chassis of the row unit and the first closing disc, the second closing disc, or both, and the one or more sensors are coupled to the bar.

19. The row unit of claim 18, comprising one or more actuators configured to adjust the position, the orientation, or both, of the first closing disc, the second closing disc, or both, wherein the one or more actuators are coupled to the bar.

20. The row unit of claim 15, wherein the controller is configured to receive one or more operating parameter inputs and to control the position, the orientation, or both, of the first closing disc, the second closing disc, or both, based on the one or more operating parameter inputs, and the one or more operating parameter inputs comprise a type of soil, a speed of the row unit, weather conditions, soil conditions, or a combination thereof.

* * * * *